United States Patent [19]

Tang et al.

[11] Patent Number: 5,521,472
[45] Date of Patent: May 28, 1996

[54] MULTIPHASE DC MOTOR AND STARTING METHOD THEREOF

[75] Inventors: Shiming Tang, Kyoto; Isao Kaneda, Moriyama; Hisashi Yamamoto, Kyoto, all of Japan

[73] Assignee: Nippon Corporation, Kyoto, Japan

[21] Appl. No.: 163,111

[22] Filed: Dec. 6, 1993

[30] Foreign Application Priority Data

| Dec. 7, 1992 | [JP] | Japan | 4-326557 |
| Dec. 7, 1992 | [JP] | Japan | 4-326558 |
| Aug. 6, 1993 | [JP] | Japan | 5-195927 |
| Aug. 10, 1993 | [JP] | Japan | 5-198282 |
| Oct. 29, 1993 | [JP] | Japan | 5-271493 |

[51] Int. Cl.$^6$ ................................................. H02K 23/00
[52] U.S. Cl. .................... 318/254; 318/139; 318/263; 318/778
[58] Field of Search .................... 318/696, 628, 318/263, 264, 286, 603, 626, 265, 254, 439, 138, 800, 806, 807, 808, 778–779, 810, 685

[56] References Cited

U.S. PATENT DOCUMENTS

| 4,607,205 | 8/1986 | Kito et al. .................. 318/806 |
| 4,876,491 | 10/1989 | Squires et al. . |
| 4,928,043 | 5/1990 | Plunkett . |
| 4,965,502 | 10/1990 | Ogasawara ................ 318/628 |
| 4,988,101 | 12/1984 | Studtman ................... 318/800 |
| 5,019,756 | 5/1991 | Schwarz . |
| 5,235,264 | 8/1993 | Kaneda et al. . |
| 5,323,094 | 6/1994 | Kaneda et al. ............. 318/254 |

*Primary Examiner*—John W. Cabeca
*Attorney, Agent, or Firm*—McCormick, Paulding & Huber

[57] ABSTRACT

A starting method for starting a multiphase DC motor having a stator provided with stator coils, a rotor provided with a rotor magnet and detector for detecting revolutions of the rotor, has stepping process and acceleration process. In the stepping process, a plurality of stepping steps is performed. The accelerating process is performed after the stepping process is completed. The plurality of the stepping steps include counter-exciting operation. Each of the plurality of stepping steps is provided by a rotation detection step. The stepping process is completed and the accelerating process is performed when a rotation detector detects that the revolutions of the rotor exceeds a predetermined value.

28 Claims, 11 Drawing Sheets

| ① | ② | ③ | ④ | ⑤ | ⑥ |
|---|---|---|---|---|---|
| u↓w | u↓v | w↓v | w↓u | v↓u | v↓w |

MULTIPHASE DC MOTOR AND STARTING METHOD THEREOF

BACKGROUND OF THE INVENTION

1. Field of the Invention

The present invention relates to a multiphase DC motor and starting method thereof, and more particularly to an improvement for improving its starting characteristics.

2. Related Art

A multiphase DC motor has been conventionally used as a motor for rotationally driving a magnetic disk unit. This type of motor is also referred to as a spindle motor, and it is well known that a spindle motor comprises a stator having stator coils supplied with exciting currents, a rotor having a rotor magnet generating a rotational force from electromagnetic interaction between the rotor magnet and the stator coils, and a position detecting sensor for detecting the rotational position (rotational angle) of the rotor magnet.

According to this type of motor, the rotational angle of the rotor magnet is detected by a position detecting sensor, and exciting currents to be supplied to the stator coils are switched in response to the detection signal from the position detecting sensor. A Hall element is used as the position detecting sensor.

In recent years, a so-called sensorless multiphase DC motor has become popular in order to minituarize the motor and to prevent characteristics of the sensor from being deteriorated. This motor detects the position of the rotor magnet based on induced voltages in a coil in which exciting currents are not flowing, instead of using the position detecting sensor.

No counter electromotive force can be obtained when the motor is stopped. Accordingly, in the sensorless motor, the rotor is swung when the motor is started. For example, in a three-phase spindle motor, a stepping process for sequentially supplying the exciting currents is repeated. During the stepping process, forward, resting and reverse exciting currents are supplied to respective phases.

However, such a multiphase DC motor has the following technical problem, particularly with respect to its starting method.

According to the multiphase DC motor, the position of the rotor magnet is detected due to the induced voltage. However, neither the voltage is induced nor the polarity of the magnet is known when the motor is stopped. Accordingly, the motor is forcibly started by generating a signal having a predetermined pattern. However, the motor may not start due to a low torque depending on the position of the rotor, or the rotor may be rotated reversely due to a magnetic field generated in a reverse direction when powered.

In order to solve the above problem and improve the starting reliability, the inventor of the present invention has proposed a novel starting method for a sensorless motor as disclosed in U.S. Pat. No. 5,235,264. This starting method includes the step of reversing, in the starting time, an exciting current from the positive direction to the negative direction or vice versa without including the rest time. When the reversing step is performed, the magnetic flux changes drastically to produce a high torque. As a result, the starting reliability is improved.

However, in the above starting method, the reversing step is performed only at one phase of the coil at a time so that a sufficient torque cannot be obtained. Thus, more improvement has been required. In addition, the time required for starting the motor is relatively long, and thus the reduction of the starting time has been demanded.

SUMMARY OF THE INVENTION

An object of the present invention is to provide a multiphase DC motor and a starting method thereof which can obtain a sufficient starting torque when it is powered.

Another object of the present invention is to provide a multiphase DC motor and a starting method thereof which can reduce the starting time.

Further objects and features of the present invention will be understood readily from the following description.

To achieve the objects, according to the first aspect of the present invention, the starting method for a multi-phase direct current (DC) motor includes:

a plurality of stepping steps for supplying the exciting currents to stator coils to start the multi-phase direct current motor, each of the stepping steps including a step for performing a counter-exciting operation in which the exciting currents are reversed without a substantial rest time;

rotation detection steps of detecting a rotation of the motor, each of the rotation detection steps being provided following a respective one of the plurality of stepping steps; and step of, when the rotation detection step detects that the number of revolutions (rotation speed) of the rotor does not reach a predetermined value, performing next stepping step, and of, when the rotation detection step detects that the number of revolutions of the rotor exceeds the predetermined value, completing the stepping process and performing an accelerating step of accelerating the rotor.

According to the second aspect of the present invention, the multiphase direct current (DC) motor, includes:

a stator provided with stator coils to which exciting currents are supplied;

a rotor provided with a rotor magnet acquiring a rotation torque by electromagnetic interaction with the stator;

bearing means inserted between the stator and the rotor;

revolution detecting means for detecting number of revolutions of the motor; and control means, connected to the stator coils and the revolution detecting means, for controlling the rotation of the rotor by supplying the exciting currents to the stator coils to perform a stepping process and an accelerating process in a starting operation such that the exciting currents are supplied to each phase of the stator coils so as to perform, in the stepping process, a counter-exciting operation in which the exciting currents are reversed without including a rest time substantially, and the stepping process is completed when the rotation detecting means detects that the number of revolutions of the rotor exceeds a predetermined value.

According to the present invention, in the counter-exciting operation, the exciting currents are reversed without substantial rest time. More specifically, the flowing directions of the exciting currents are reversed from the negative direction to positive direction or positive direction to negative direction without substantial rest time. Due to this, the starting probability of the motor is greatly improved.

DETAILED DESCRIPTION OF THE PREFERRED EMBODIMENTS

The present invention will now be described in more detail with reference to the accompanying drawings.

FIGS. 1 through 7C show a first embodiment of a multiphase direct current (DC) motor according to the present invention.

Figure 1:
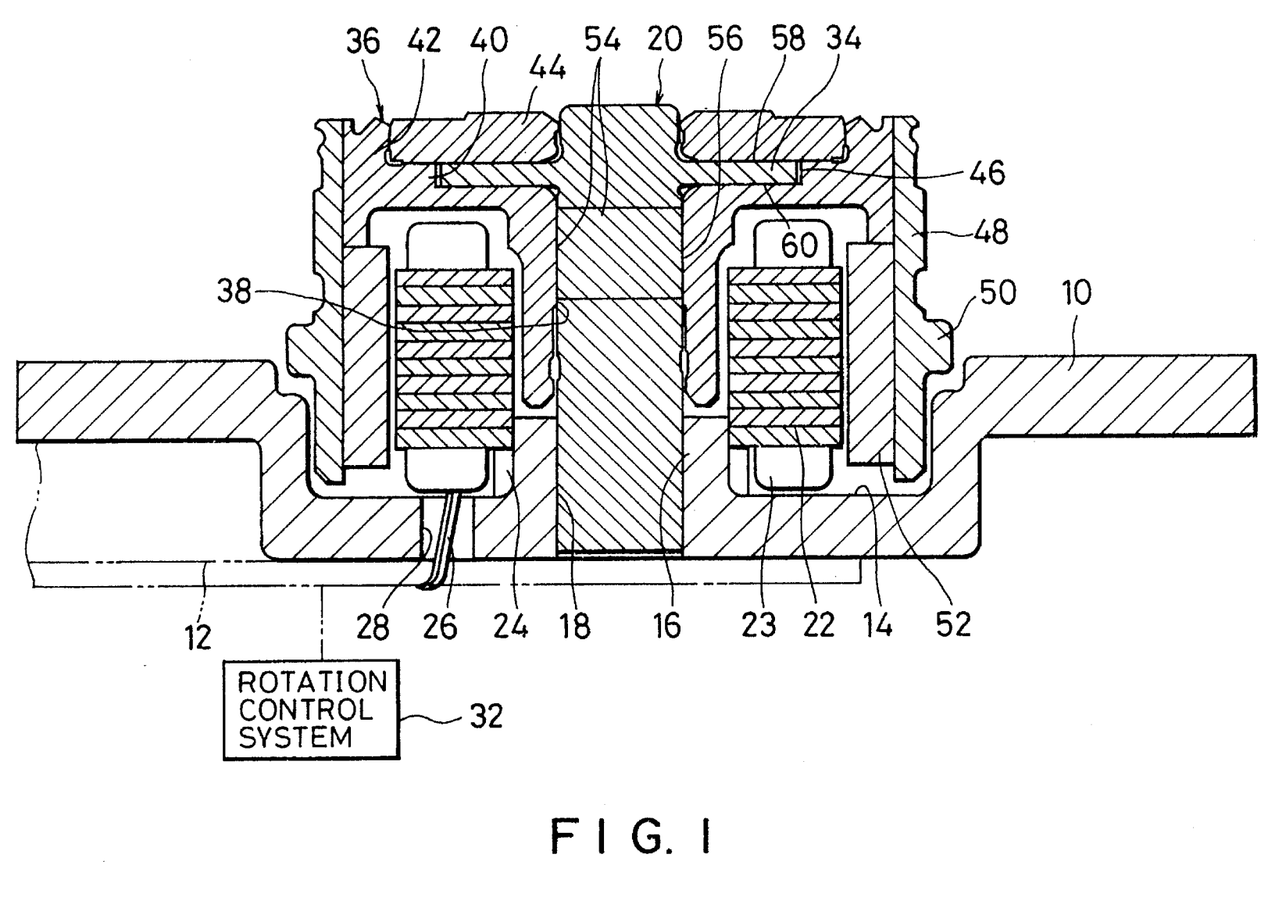
FIG. 1 is a cross sectional view of an embodiment of a multiphase DC motor according to the present invention.

As shown in FIG. 1, a multiphase motor has a bracket 10 which is mounted on a lower housing 12 of a magnetic recording apparatus. An upwardly protruding portion 16 is formed on the inner peripheral portion of an upward opened annular concave portion 14 of the bracket 10. A through hole 18 extends vertically through the central portion of the upwardly protruding portion 16. The bracket 10 can be formed integrally with the lower housing 12. The lower end portion of an approximately cylindrical shaft 20 is fixedly inserted in the through hole 18 of the bracket 10 so that the shaft 20 is erected on the central portion of the bracket 10.

The lower portion of the inner peripheral portion of a stator core 22 is fixedly mounted on the outer peripheral surface of the upwardly protruding portion 16. An annular spacer 24 for positioning the stator core 22 in an axial direction is disposed between the surface of the lower end portion of the inner peripheral surface of the stator core 22 and the bottom surface of the annular concave portion 14.

The stator core 22 has a plurality of detents arranged circumferentially at intervals. A predetermined number of windings of a stator coil 23 is wound around each detent. In the embodiment, the stator coils 23 comprise three-phase coils u, v and w to which currents are supplied as described later.

Figure 2:
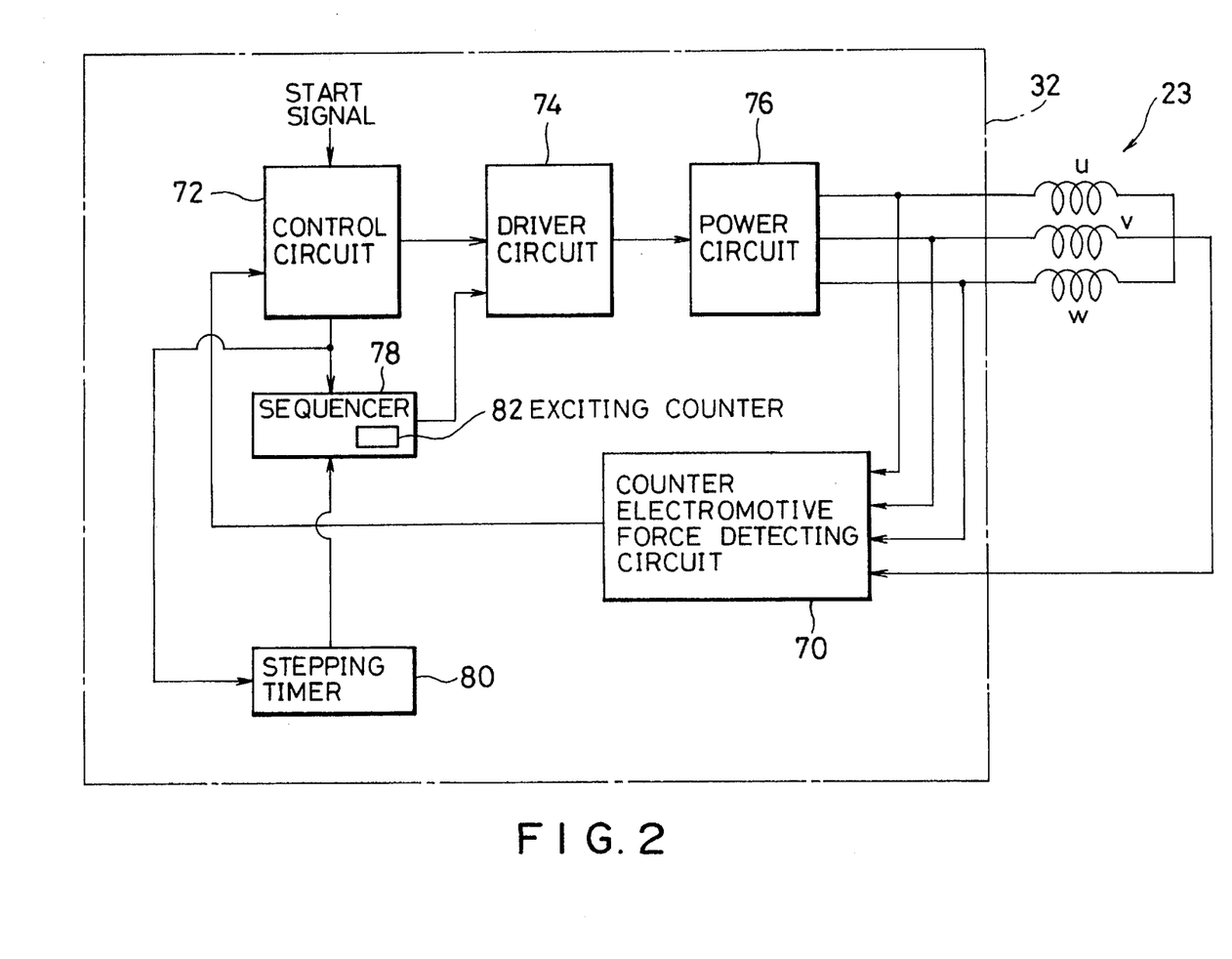
FIG. 2 is a block diagram showing a control system adapted to the motor shown in FIG. 1.

The lead 26 of the three-phase stator coils u, v and w is pulled downward through a lead hole 28 penetrating a bottom plate of the annular concave portion 14 of the bracket 10, and electrically connected to a flexible circuit board 30 which is connected to a control system 32 shown in FIG. 2. Exciting currents from the control system 32 are supplied to the stator coils u, v and w. An annular thrust plate 34 protruding radially and outwardly is integrally formed on the upper portion of the shaft 20. The upper and bottom surfaces of the thrust plate 34 are formed perpendicular to the outer peripheral portion having approximately cylindrical surface of the shaft 20.

A sleeve member 36 is approximately cylindrical and an outer diameter of the upper end portion of which is widened. The inner peripheral portion of the sleeve member 36 comprises an approximately cylindrical radial sliding portion 38 having a small diameter, an intermediate inner diameter portion 40 which is widened at the upper portion of the radial sliding portion, and a large inner diameter portion 42 which is further widened at the upper portion of the intermediate inner portion 40.

The sleeve member 36 is mounted on the shaft 20 from the bottom portion of the member 36 before the shaft 20 is fixedly inserted in the through hole 18. An annular thrust holding plate 44 is inserted in the large inner diameter portion 42 of the sleeve member 36 with the inner peripheral portion of the thrust holding plate 44 being slightly apart radially from the shaft 20. The upper portion of the large inner diameter portion 42 is calked inwardly at four points with 90 degrees apart each other, for example so as to fix the thrust holding plate 44. The thrust holding plate 44 is fixedly inserted in radially inwardly opened annular concave portion 46 formed in the intermediate inner diameter portion 40 by the thrust holding plate 44 and the sleeve member 36. The lower portion of the shaft 20 protrudes downwardly from the sleeve member 36. The shaft 20 is mostly engaged with the through hole 18 of the bracket 10. A portion corresponding to the radial sliding portion 38 of the outer peripheral portion having approximately cylindrical surface of the shaft 20 serves as a radial receiving portion.

A rotor hub 48 made of a ferromagnetic material is approximately cylindrical. The rotor hub 48 is fixedly and coaxially mounted on the upper outer peripheral portion of the sleeve member 36. The lower end portion of the rotor hub 48 is inserted in the annular concave portion 14. An annular extending portion 50 for supporting the bottom surface of the inner peripheral portion of a hard disk is formed on the outer peripheral portion of the rotor hub 48. Note that the rotor hub 48 and the sleeve member 36 may be integrally formed.

A cylindrical rotor magnet 52 facing to the stator core 22 with a gap in the radial direction is fixedly inserted in the inner peripheral portion of the rotor hub 48. A top surface of the rotor magnet 52 is in contact with the bottom surface of the upper outer peripheral portion of the sleeve member 36 so that the rotor magnet 52 is positioned in an axial direction.

A herringbone groove 54 is formed in approximately upper half annular portion of the radial sliding portion 38 of the sleeve member 36. The herringbone groove 54 and the radial receiving portion of the shaft 20 constitute a radial dynamic pressure bearing portion 56. The bearing portion 56 permits the filled liquid lubricant to produce a radial load bearing pressure by the rotation of the sleeve member 36 in a predetermined direction. The herringbone groove 54 may be formed in the radial receiving portion 38 of the shaft 20. Further, a groove other than the herringbone groove may be adopted.

The upper and lower annular surfaces (axial receiving portion) of the thrust plate 34 and the upper and lower annular surfaces (axial sliding portion) of the annular concave portion 46 constitute the axial dynamic pressure bearing portions 58 anal 60. The upper and lower annular surfaces of the thrust plate 34 face parallelly to the upper and lower annular surfaces of the annular concave portion 46, and liquid lubricant is filled therebetween to form a slight gap in an axial direction. The herringbone groove (not shown) is formed entirely and circumferentially on the upper and lower annular surfaces of the thrust plate 34. The herringbone groove permits the lubricant filled between the upper and lower annular surfaces of the annular concave portion 46 to produce a high pressure by the rotation of the sleeve member 36 and the thrust holding plate 44 in a predetermined direction. The herringbone groove may be formed on the upper and lower annular surfaces of the annular concave portion 46 facing to the upper and lower annular surfaces of the thrust plate 36. Further, the groove other than the herringbone groove may be adopted.

As described above, the sleeve member 36, the rotor hub 48, etc. are arranged to be freely rotated through the lubricant with respect to the shaft 20, the stator core 22 and the like. The displacement of the rotating sleeve member 36 with respect to the shaft 20 in the radial direction can be sufficiently constrained to a small value by the radial dynamic pressure bearing portion 56. Furthermore, the displacement of the rotating sleeve member 36 with respect to the shaft 20 in an axial direction can be sufficiently constrained to a small value by the axial dynamic pressure bearing portions 58 and 60.

When the sleeve member 36 is rotated with respect to the shaft 20, the lubricant filled in the gaps between the sleeve member 36 and the shaft 20 and the thrust holding plate 44 and the shaft 20 is introduced into the herringbone groove portion of the radial dynamic pressure bearing portion 56 and the herringbone portion of the axial dynamic pressure bearing portions 58 and 60. The radial dynamic pressure bearing portion 56 permits the introduced lubricant to produce mainly the radial load bearing pressure, and the axial dynamic pressure bearing portions 58 and 60 permit the introduced lubricant to produce mainly the axial load bearing pressure.

FIG. 2 shows a rotation control system 32 of the motor shown in FIG. 1. The control system 32 can obtain a remarkable advantage to be described later when used for a motor using the dynamic pressure bearing. However, a similar advantage can be achieved even when the control system 32 used for a motor using a normal ball bearing.

The rotation control system 32 in FIG. 2 comprises a counterelectromotive force detecting circuit 70, a control circuit 72 (which constitutes control means), a driver circuit 74 (which constitutes driver means), a power circuit 76, a sequencer 78, and a stepping timer 80. The counterelectromotive force detecting circuit 70 detects the counterelectromotive force induced in the three-phase coils u, v, w (stator coil 23) in the rest time in which the exciting currents are not supplied. A detection signal from the counterelectromotive force detecting circuit 70 is input to the control circuit 72. The driver circuit 74 is connected to the output stage of the control circuit 72. The sequencer 78 includes an exciting counter 82.

The power circuit 76 receives an output signal from the driver circuit 74 operating in accordance with command signal from the control circuit 72, and supplies the exciting currents to the coils u, v, and w in the form of a pattern based on an exciting pattern signal. The control circuit 72 controls the steady operation of the motor after being started in accordance with the signal from the counterelectromotive force detecting circuit 70.

Figure 3:
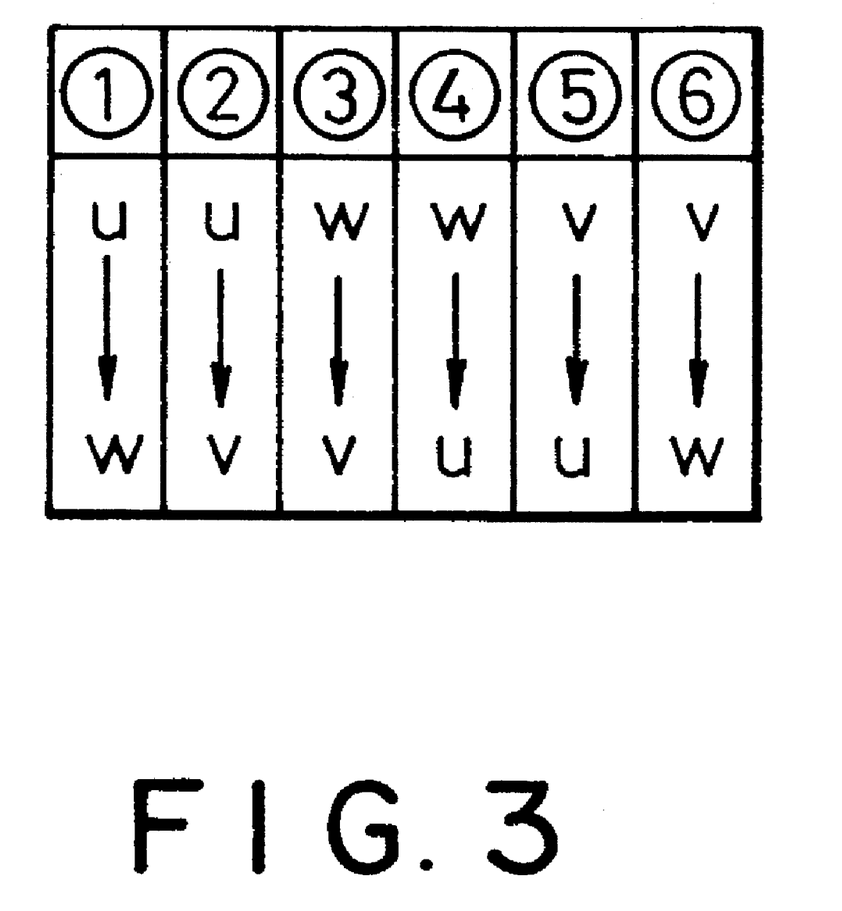
FIG. 3 is a diagram showing internal stepping pattern signals generated by a sequencer in the control system of FIG. 2.

The sequencer 78 generates preliminarily set internal stepping pattern signals in response to a control signal from the control circuit 72. In this embodiment, the internal stepping pattern signals in which 6 stepping steps of (i) u→v, (ii) w→v, (iii) w→u, (iv) v→u, (v) v→w, and (iv) u→w are repeated are generated with respect to the stator coils u, v, and w, as shown in FIG. 3.

The exciting counter 82 changes the internal stepping pattern signals in accordance with the control signal from the control circuit 72. For example, when the exciting counter 82 is set to +1, the exciting pattern signals in which the stepping steps of (i) through (vi) shown in FIG. 3 are repeated are supplied to the driver circuit 74. When the exciting counter 82 is set to +2, the exciting pattern signals in which the steps of (i), (iii), and (v) shown in FIG. 3 skipped every other step in a forward direction are repeated are supplied to the driver circuit 74. Note that a counter exciting operation to be described later can also be achieved by skipping the internal stepping pattern signals shown in FIG. 3 every other step in the backward direction or skipping the internal stepping pattern signals every two steps in a forward or backward direction.

Figure 4:
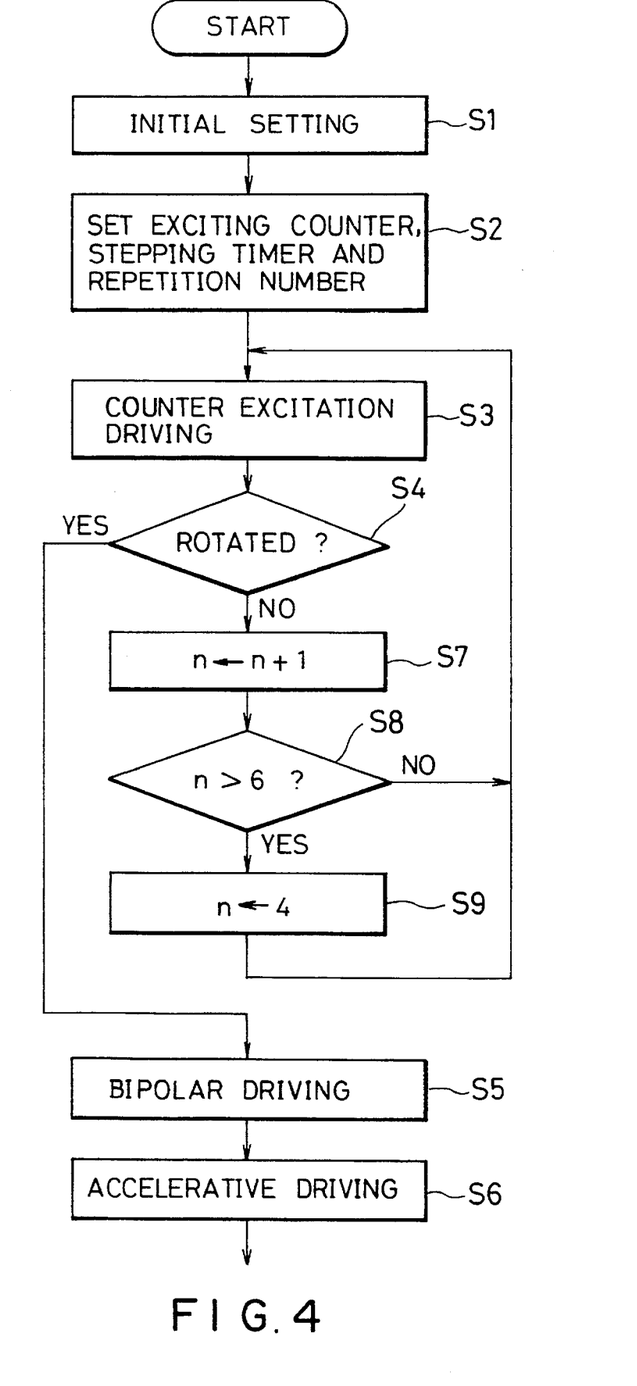
FIG. 4 is a flowchart showing the control steps performed by the control system of FIG. 2.

In the control flow shown in FIG. 4, when the control circuit 72 starts upon receiving a start signal, the initialize operation is performed in step S1. Then, in step S2, the exciting counter 82 is set to 2, the stepping timer 80 is set to T1, and a repetition number n for supplying the exciting currents when powered is set. In this embodiment, n is set to 6 but can be set to an arbitrary value. The supplement time period of the exciting currents is set and changed while taking account of the resonant frequency of the head system (such as a magnetic head for writing into and/or reading data from a recording medium and an arm supporting the magnetic head) or a drive system (a recording medium and a rotor hub 48 of the spindle motor) of the magnetic disk drive in which the motor is used.

In step S3, the exciting currents are supplied to the coils u, v, and w in accordance with the contents set in step S2. According to the conditions set in step S2, the exciting counter 82 is set to +2, and the stepping timer 80 is set to T1. Therefore, the exciting currents are supplied to the coils in the order of u→w, w→v, and v→u during 3T1 period, as shown in FIGS. 5A through 5C.

Figure 5A:
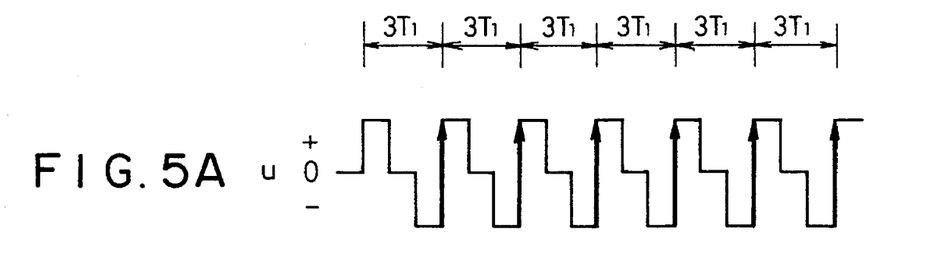
FIG. 5A is a time chart showing exciting currents supplied to stator coils by performing the control steps of FIG. 4.
Figure 5B:
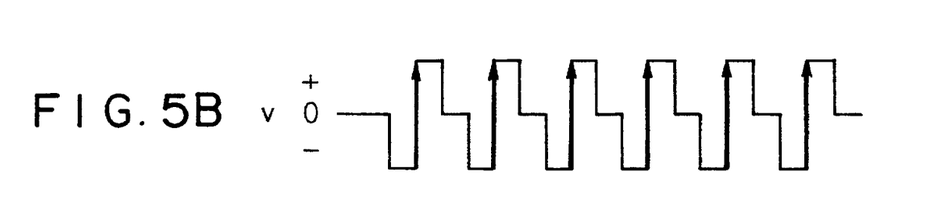
FIG. 5B is a time chart showing exciting currents supplied to stator coils by performing the control steps of FIG. 4.
Figure 5C:
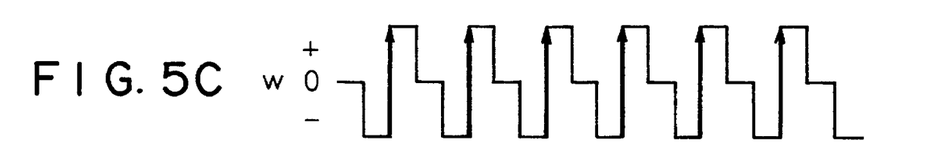
FIG. 5C is a time chart showing exciting currents supplied to stator coils by performing the control steps of FIG. 4.

When such exciting currents are supplied to the coils u, v, and w, the counter exciting operation is sequentially performed once in each phase in which a direction of the exciting current is reversed from the negative direction to the positive direction, as indicated by thick arrows shown in FIGS. 5A through 5C. According to the counter exciting operation of this embodiment, the directions of the exciting currents are reversed from the negative direction to the positive direction. However, the counter exciting operation may be achieved by reversing the exciting currents from the positive direction to the negative direction. Then, in step S4, it is determined whether or not the motor is rotated. This determination can be implemented by using a known zero-crossing method.

When it is determined that the motor is rotated (the number of revolutions (rotation frequency or rotation speed) of the motor 20 reaches a predetermined value) in step S4, the stepping process is completed, the counter exciting operation is switched to a normal bipolar driving in step S5. In the bipolar driving, the exciting currents are sequentially and repetitively supplied to the stator coil 23 in the order of (i) u→w, (ii) u→v, (iii) w→v, (iv) w→u, (v) v→u, and (vi) v→w (step S6). In the accelerating step, the control circuit 72 controls the driver circuit 74 in accordance with the detection signal from the counterelectromotive force detecting circuit 70. Note that a normal unipolar driving may be adopted instead of the bipolar driving.

When it is determined that the motor 20 is not rotated (the number of revolutions of the motor 23 does not reach a predetermined value) in step S4, the repetition number n is incremented by one in step S7 and it is determined whether or not the repetition number n is larger than 6 in step S8. If it is determined that the repetition number n is equal to or smaller than 6 in step S8, the flow returns to step S3 in which the stepping is advanced to the next step and the counter exciting operation is performed.

If it is determined that the repetition number n is larger than 6, the repetition number n is set to 4 in step S9, and then the flow returns to step S3 in which the counter exciting operation is performed again from the fourth stepping step. Note that the value of the repetition number n set in step S9 is not limited to 4 and an arbitrary integer value within the range set in step S2 can be set.

When the motor is started in accordance with the above described procedure, the counter exciting operation is sequentially performed in the coils u, v, and w in the stepping process as shown in the time charts of FIGS. 5A through 5C, whereby the stepping steps are repetitively performed 6 times at maximum. When the counter exciting operation is performed in the multi-phases, the variation of the magnetic flux density becomes large and thus the large and continuously increased torque is achieved. The increase of the torque is repetitively performed and thus the starting probability is improved.

As a result, the starting current can be reduced and the power dissipation for starting the motor can be lowered compared to those of a conventional motor. Furthermore, the presence or absence of the rotation can be detected during the sequence, further reduction of the power dissipation for the start operation can be achieved.

Figure 6:
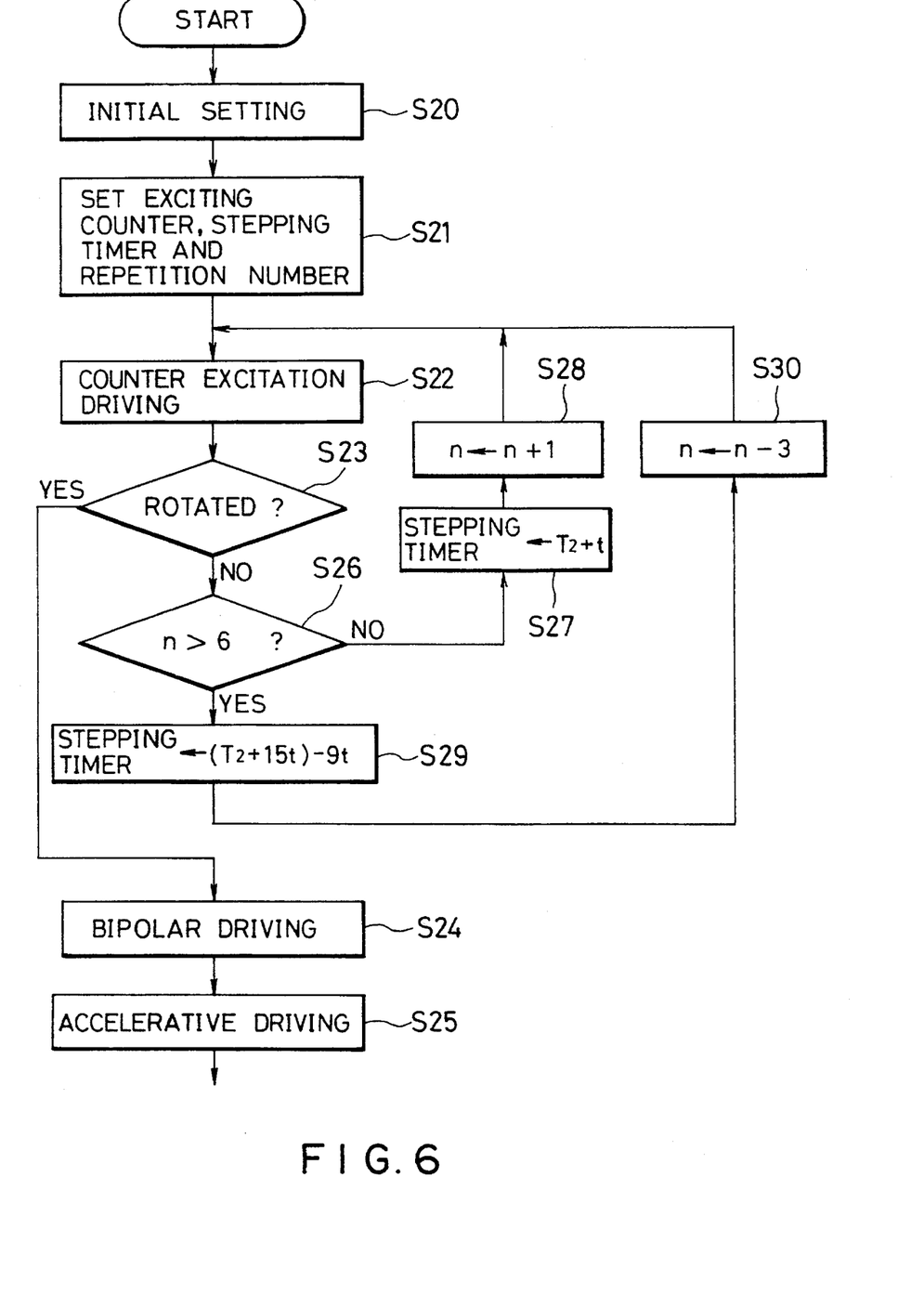
FIG. 6 is a flowchart of modified control steps.
Figure 7A:
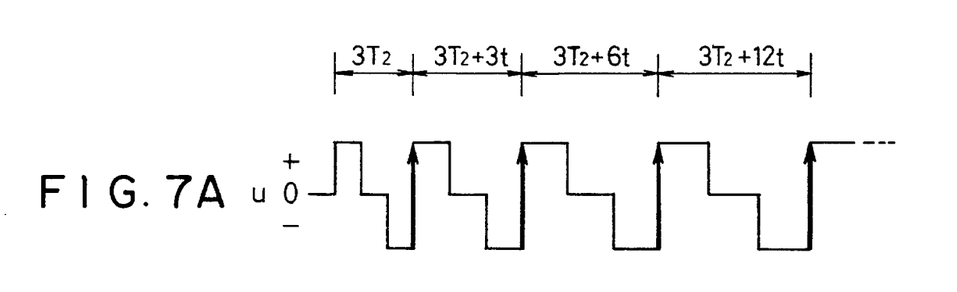
FIG. 7A is a time chart showing exciting currents supplied to stator coils by performing the modified control steps.
Figure 7B:
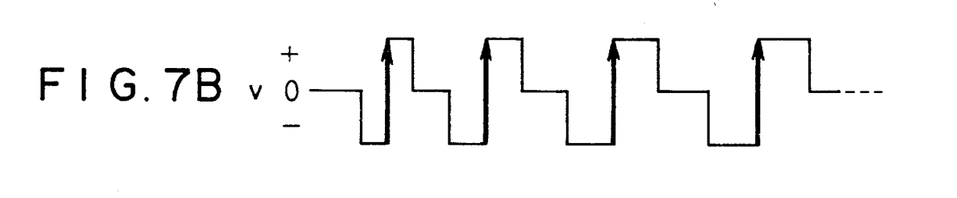
FIG. 7B is a time chart showing exciting currents supplied to stator coils by performing the modified control steps.
Figure 7C:
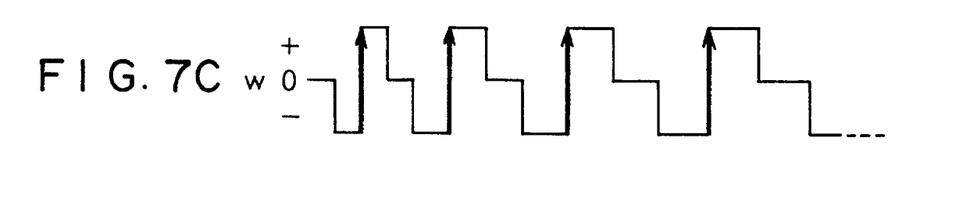
FIG. 7C is a time chart showing exciting currents supplied to stator coils by performing the modified control steps.

FIGS. 6 and 7 show a modification of the control procedure by the control system 32 and only the features thereof will be described below.

According to the modification, the control steps executed by the control circuit 72 are different. More specifically, when the control circuit 72 operates upon receiving the start signal, the initialize operation is performed in step S20, and the exciting counter 82 and the stepping timer 80 are reset. In step S21, the exciting counter 82 is set to +2 and the stepping timer 80 is set to T2. Furthermore, the repetition number n for supplying the exciting current for the start operation is set. In this modification, n is set to 6 but may be set to an arbitrary integer value.

Then, in step S22, the first stepping step is performed in accordance with the contents set in the step S21, and thus the exciting currents are supplied to the coils u, v, and w. According to the conditions set in the step S21, the exciting counter is set to +2, and the stepping timer 80 is set to T2. Therefore, the exciting currents flowing in the order of u→w, w→v, and v→u for the time of 3T2 are supplied to the coils in accordance with the exciting stepping pattern signals supplied from the sequencer 78 to the driver circuit 74, as shown in FIGS. 7A to 7C.

When such exciting currents are supplied to the coils u, v, and w, the exciting operation is sequentially performed once in each phase in which the direction of the exciting current is reversed from the negative direction to the positive direction without including the rest time, as shown in FIG. 7. In this case, the cycle of the exciting current to be supplied to the coil 23 first is preferably set to be approximately identical with, or divided frequency of (½, ⅓ ...), or n (n=2, 3 ...) times the resonant frequency of the head system or the drive system of the magnetic disk drive. Due to this, the head can be effectively floated over the recording medium when the motor is powered. Then, in step S23, it is determined whether or not the motor is rotated. This determination uses the known zero-crossing method as in the previous embodiment.

If it is determined in step S23 that the motor is rotated, the stepping process is completed and then the accelerating step is executed. More specifically, the conventional bipolar driving is executed in step S23 and then the control is advanced to the accelerative driving (step S25). On the other hand, if it is determined in step S23 that the motor is not rotated, it is determined in step S26 whether or not the repetition number n is larger than 6. If it is determined in step S26 that the repetitive number n is equal to or smaller than 6, a predetermined time t is added to the set time T2 of the stepping timer 80 in step S27. Furthermore, the repetition number n is incremented by one in step S28, and the flow returns to step S22 in which the counter exciting operation is performed again. Although being different depending on a type of the motor, the set time T2 and the predetermined time t may be set approximately 18 msec and 2 msec, respectively.

Figure 8:
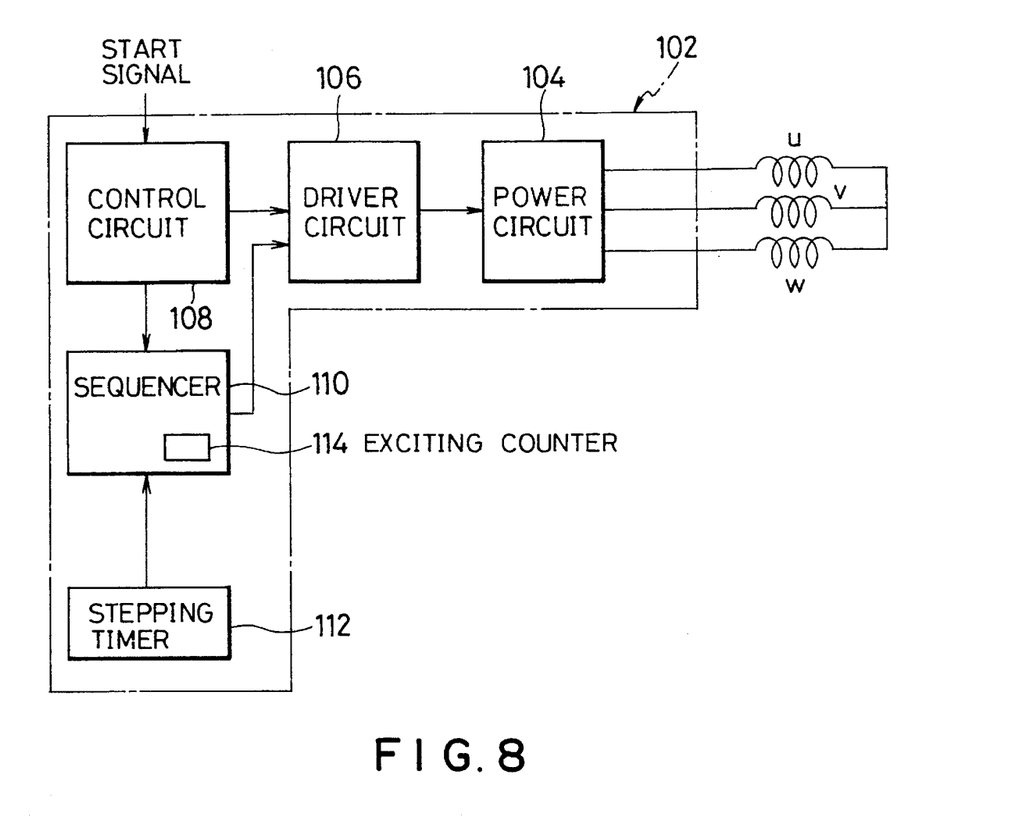
FIG. 8 is a block diagram showing another embodiment of the control system applied to the motor shown in FIG. 1.

If it is determined in step S23 that the motor is not rotated, the stepping steps are repeated 6 times at maximum. Each time the flow passes the step S27, the set time of the timer 80 is incremented by t, resulting in that the time for supplying the exciting currents in FIG. 8, the control system 102 includes: a power circuit 104 to which one terminals of the stator coils u, v, and w are connected; a driver circuit 106 the output stage of which is connected to the power circuit 104; a control circuit 108 an output stage of which is connected to the driver circuit 106; a sequencer 110 connected to the output stage of the control circuit 108; and a stepping timer 112. The sequencer 110 includes an exciting counter 114.

Upon receiving the output signal from the driver circuit 106 operating in accordance with the command from the control circuit 108, the power circuit 104 supplies the exciting currents in the form of the pattern signals set by the sequencer 110 to the coils u, v, and w. The control circuit 108 controls the starting operation of the motor and the rotation of the motor after being started. Upon receiving the control signal from the control circuit 108, the sequencer 110 supplies the preliminary set pattern signals to the driver circuit 106. In the stepping process, the sequencer 110 generates the internal stepping pattern signals, changes the exciting stepping pattern signals in response to the signal from the control circuit 108, and supplies them to the driver circuit 106. Further, in the rotational driving (accelerating process and constant speed process), the sequencer 110 generates the internal drive pattern signals, changes the the counter exciting operation is sequentially increased by the predetermined time t (see FIG. 7). If it is determined in step S26 that the repetition number n is larger than 6, the flow returns to step S22 in which the counter exciting operation is performed again from the fourth stepping step. Before return to step S22, the set time of the stepping timer 80 is decreased by 9t in step S29 (when n=6, the set time will be (3T2+15t) and thus 9t is subtracted from (3T2+15t)). Furthermore, the repetition number n is decreased by 3 in step S30. Accordingly, the repetition number n starts from 4 when the flow returns to step S22.

When the motor is started as described above, the counter exciting operation is performed in each coil u, v, and w as shown in the time charts of FIGS. 7A through 7C, and the stepping steps are repeated 6 times. Each time the stepping steps are repeated, the supplement time of the exciting current is gradually increased so that the starting probability can further be improved. When the number of revolutions of the rotor exceeds a predetermined value during the stepping process, the stepping process is completed and the control is advanced to the accelerating process. Accordingly, the time of the stepping process can be shortened resulting in reduced starting time.

The motor shown in FIG. 1 can also be driven by the control system shown in FIGS. 8 through 11. In exciting drive pattern signals in response to the signal from the control circuit 108, and supplies them to the driver circuit 106. In the embodiment, the internal stepping pattern signals and the internal drive pattern signals are comprised of substantially identical pattern signals. These pattern signals are arranged such that 6 steps of (i) u→v, (ii) w→v. (iii) w→u, (iv) v→u, (v) v→w, and (vi) u→w are repeated with respect to the stator coils u, v, and w.

Figure 9:
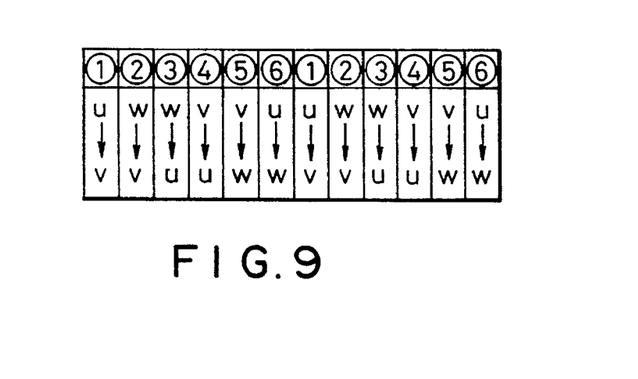
FIG. 9 shows internal stepping pattern signals produced by a sequencer in the control system of FIG. 8.

Upon receiving the signal from the control circuit 108, the exciting counter 114 changes the internal stepping pattern signal (or the internal drive pattern signal) in the sequencer 110 in the stepping process (or in the accelerating process and the constant speed process). For example, if the value of the exciting counter 114 is set to 11, the internal stepping pattern signals (or the internal drive pattern signals) are converted into the exciting stepping pattern signals (or the exciting drive pattern signals) such that the exciting currents in which the steps (i) through (vi) shown in FIG. 9 are repeated are supplied to the stator coils u, v, and w. Further, if the value of the exciting counter 114 is set to 2, the internal stepping pattern signals (or the internal drive pattern signals) are converted into the exciting stepping pattern signals (or the exciting drive pattern signals) such that the exciting currents in which the steps of (i), timer 112 is set to T3, T4, and T5. Accordingly, the internal pattern signals are skipped every two steps in a backward direction, and thus the exciting currents are supplied in the order of u→v, v→w, and w→u each for the time of T3, T4 and T5.

Figure 11A:
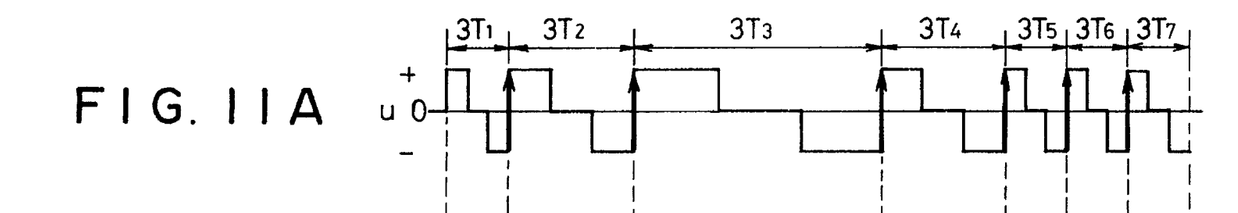
FIG. 11A is a time chart showing exciting currents supplied to stator coils by performing the control steps of FIG. 10.
Figure 11B:
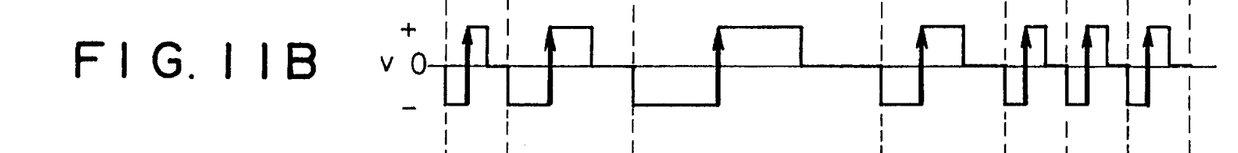
FIG. 11B is a time chart showing exciting currents supplied to stator coils by performing the control steps of FIG. 10.
Figure 11C:
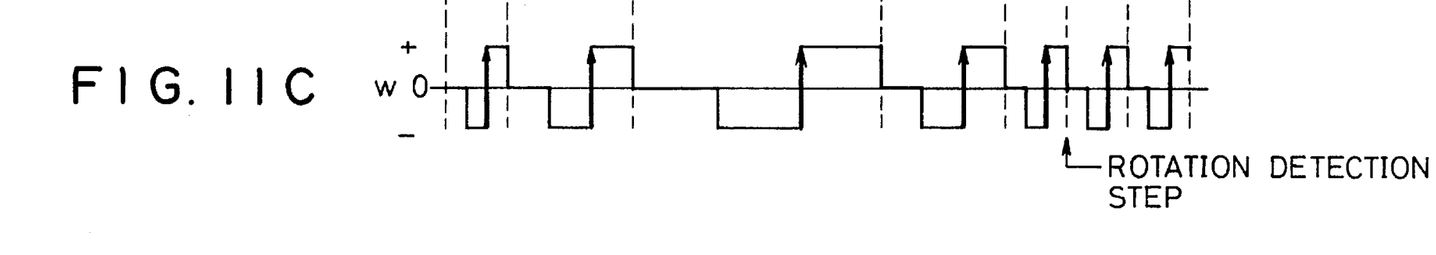
FIG. 11C is a time chart showing exciting currents supplied to stator coils by performing the control steps of FIG. 10.

When the exciting currents are supplied to each stator coils u, v and w, the counter-exciting operation in which the exciting currents are reversed from the negative to positive direction is sequentially performed in the coils u, v and w in the order of the stator coils u, v and w without including the rest time, as shown in FIG. 11. Due to this, the change of the magnetic flux density becomes large in the stator core. Accordingly, a higher torque is generated even in the rotation after started, and thus the starting probability of the motor is greatly improved.

Further, in the previous process (stepping process), the set time of the stepping timer 42 is preferably set to T1<T2<T3>T4>T5 in which the set time is longest in the intermediate step and gradually shortened as the step advances toward the first step or the final step. Furthermore, the repetition frequency (1/set time T1–T5 of the stepping timer 112) of the exciting current in each step is preferably set to such a value that the frequency is gradually decreased from the natural oscillation frequency as the step advances toward the first step or (iii) and (v) are repeated while skipping every other step in a forward direction are supplied to the stator coils u, v, and w.

Figure 10:
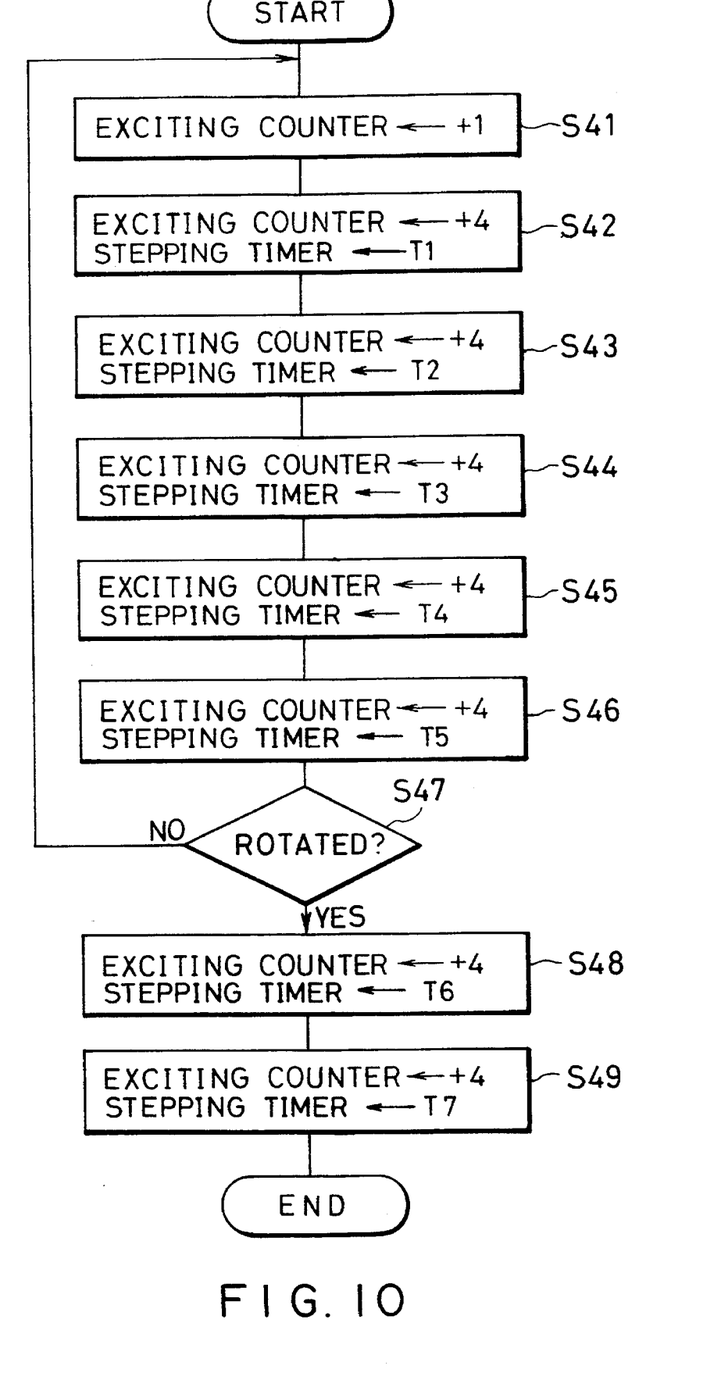
FIG. 10 is a flowchart showing control steps performed by the control system of FIG. 8.

The stepping timer 112 sets the supplement time of the exciting currents set by the exciting counter 114 in accordance with the signal from the control circuit 108. FIG. 10 shows an example of the control steps executed by the control circuit 108, and FIGS. 11A through 11C show time charts of the exciting currents supplied to the stator coils u, v, and w in the start operation and the constant speed operation of the motor.

In the control steps shown in FIG. 10, the control circuit 108 operates upon receiving the start signal. First, the exciting counter 114 is set to +1 in step S41, and then the exciting counter 114 is set to +4 and the stepping timer 112 is set to T1, in step S42. Due to this, the exciting currents are supplied to the stator coils u, v, and w in the order of u→v, v→w and w→u, each for the time of T1 as shown in FIGS. 11A through 11C.

In step S43, the exciting counter 114 is set to +4, and the stepping timer 112 is set to T2. In this step too, the exciting currents are supplied for the time of T2 in the order of u→v, v→w, and w→u as in step S42, as shown in FIG. 10. In steps S4, S5, S6, the exciting counter 114 is set to +4 and the stepping the final step from the step having the natural oscillation frequency.

By setting the frequency to the values described above, the starting of the motor can be performed more smoothly by the resonant operation.

Note that the conduction time in each step of the stepping timer 112 may be set to be constant (T1=T2=T3=T4=T5) as a particular case. When the above conduction process is executed each for the time set by the stepping timer 112, it is determined whether or not the motor is rotated in step S47. If it is determined in step S47 that the motor is not rotated, the flow returns to step S41, and the stepping process is repetitively performed by the same procedure.

On the other hand, if it is determined that the motor is rotated in step S47, the flow advances to the next steps S8 and S9 in which the counter-exciting operation similar to that described above is performed to rotate the motor (accelerating process, constant-speed process).

According to the control method of the multi-phase DC motor performed by the above-described procedure, the counter-exciting operation in which the conduction direction is reversed without including the rest time is sequentially performed in each phase in the start operation, resulting in greatly-increased torque due to the counter-exciting operation. Even after the motor is started and the rotation begins, the counter-exciting operation is sequentially performed in a plurality of phases. Accordingly, the magnetic flux density is largely varied, resulting in higher torque even in the rotation, similar to the start operation.

Figure 12A:
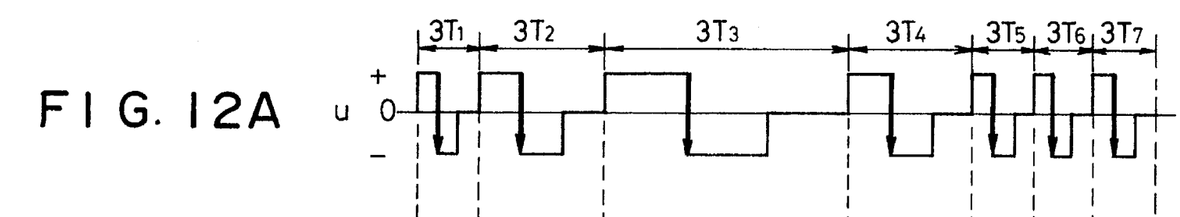
FIG. 12A is a time chart showing exciting currents supplied to stator coils by performing the modified control steps.
Figure 12B:
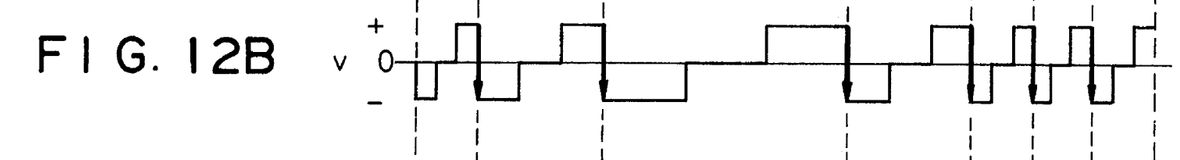
FIG. 12B is a time chart showing exciting currents supplied to stator coils by performing the modified control steps.
Figure 12C:
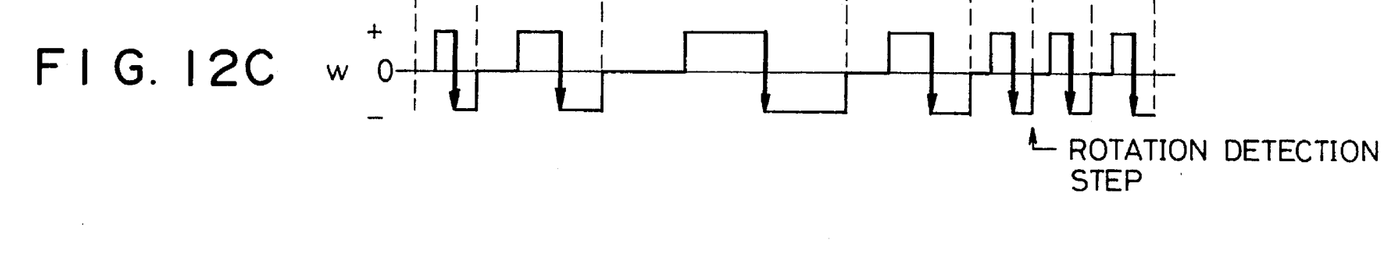
FIG. 12C is a time chart showing exciting currents supplied to stator coils by performing the modified control steps.

FIGS. 12A to 12C show a modification of the above-described control method, and the feature thereof will be described below. According to the modification, the exciting counter 114 is set to +2 in steps S2 through S6, S8 and S9 in the flowchart of FIG. 10 executed by the control circuit 108.

As is apparent from the pattern signals shown in FIG. 9, when the exciting counter 114 is set to +2, the exciting currents are supplied in each step in the order of coils u→v, w→u, and v→w as shown in FIG. 12. In this case, the counter-exciting operation in which the exciting currents are reversed from the positive direction to the negative direction without including the rest time is sequentially performed in the order of the stator coils u, w, and v, as shown by the thick arrows in FIGS. 12A to 12C. Due to this, the starting probability of the motor is greatly improved as well as the torque at the constant-speed operation is increased. Thus, the same advantage as in the above embodiment can be achieved.

In the above embodiments and modifications, the counter-exciting operation is performed by skipping every other internal pattern signals in the forward direction or every two internal pattern signals in the backward direction. However, the counter-exciting operation can also be performed by skipping every other internal pattern signals in the backward direction or every two internal pattern signals in the backward direction.

In the above description, a case in which the present invention is applied to a three-phase DC motor has been exemplified. However, the present invention is not limited to the above embodiments and can be applied to other multi-phase motors.

What is claimed is:

1. A starting method for a multi-phase direct current motor having a stator provided with stator coils to which exciting currents are supplied, a rotor provided with a rotor magnet acquiring a rotation torque by electromagnetic interaction with the stator, and rotation detecting means for detecting the rotation of the rotor, the starting method comprising:

a plurality of stepping steps of supplying the exciting currents to the stator coils to start the multi-phase direct current motor, each of the stepping steps including a step for performing a counter-exciting operation in which directions of the exciting currents flowing through the coils are reversed without a substantial rest time;

rotation detection steps of detecting a rotation of the rotor by means of the rotation detecting means, each of the rotation detection steps being provided following to respective one of the plurality of stepping steps; and step of, when the rotation detecting means detects in the rotation detection steps that the number of revolutions of the rotor does not reach a predetermined value, performing next stepping step, and of, when the rotation detecting means detects that the number of revolutions of the rotor exceeds the predetermined value, completing the stepping process and performing an accelerating step of accelerating the rotor.

2. The starting method according to claim 1, wherein the plurality of stepping steps each comprise a plurality of steps sequentially supplying the exciting currents to the stator coils.

3. The starting method according to claim 1, wherein the counter-exciting operation is sequentially performed in each phase of the stator coils, with respect to each of the plurality of stepping steps.

4. The starting method according to claim 3, wherein the stator coils comprise three-phase coils and the counter-exciting operation performed in every stepping step is sequentially performed once in each of the three-phase coils.

5. The starting method according to claim 1, wherein the supplement time of the exciting currents in the counter-exciting operation is gradually increased for every stepping step.

6. The starting method according to claim 1, wherein the stepping steps and the rotation detection step are performed for first predetermined number of times; and when the rotation detecting means detects in the rotation detection steps that the number of revolutions of the rotor does not reach a predetermined value after the stepping steps are performed for the first predetermined number of times, the stepping steps and the rotation detection step are performed for second predetermined number of times less than the first predetermined number of times.

7. The starting method according to claim 6, wherein the supplement time of each of the exciting currents in the counter-exciting operation is increased for every stepping step, decreased after the performance for the first predetermined number of times, and then gradually increased for every steps during a period between the completion of the performance of the first predetermined number of times and the performance of the second predetermined number of times.

8. The starting method according to claim 7, wherein the supplement time of each of the exciting currents is increased for every stepping step until the stepping steps and rotation detection steps are performed 6 times, and 4th to 6th stepping steps and 4th to 6th rotation detection steps are performed again when the rotation detecting means detects that number of revolution does not reach a predetermined value in sixth detection step.

9. The method according to claim 1, wherein the motor includes:

a sequencer for generating predetermined internal stepping pattern signals;

driver means for supplying the exciting currents to the stator coils in accordance with the internal stepping pattern signals from the sequencer; and control means for controlling the internal stepping pattern signals supplied from the sequencer to the driver means;

and wherein the control means controls the sequencer to supply exciting stepping pattern signals skipped by one or two signals from the internal stepping pattern signal in a forward or backward direction, whereby the counter-exciting operation is performed.

10. The method according to claim 1, wherein the stator coils are activated by a bipolar driving in the accelerating step.

11. A starting method for a multi-phase direct current motor having a stator provided with stator coils to which exciting currents are supplied, and a rotor provided with a rotor magnet acquiring a rotation torque by electromagnetic interaction;

the starting method including stepping, transfer and accelerating steps both performed in a starting operation;

the stepping step including a step of performing a counter-exciting operation in which the exciting currents are reversed without including a substantial rest time, the counter-exciting operation being sequentially performed in each phase of the stator coils such that a frequency of the exciting currents to be supplied to the stator coils is approximately identical with a natural oscillation frequency of the motor in the transfer step.

12. The starting method according to claim 11, wherein the stator coils are activated by bipolar driving, in the accelerating process.

13. The starting method according to claim 11, wherein the stator coils are activated by the counter-exciting operation, in the accelerating step.

14. The starting method according to claim 11, further comprising:

a sequencer for generating predetermined internal drive pattern signals;

driver means for supplying the exciting currents to the stator coils in accordance with the internal drive pattern signals; and control means for controlling the internal drive pattern signals supplied from the sequencer to the driver means;

and wherein the control means controls the sequencer to supply the driver means with exciting drive pattern signals skipped every other signal or every two signals in a forward or backward direction from the internal driver pattern signals, whereby the counter-exciting operation is performed in the accelerating process.

15. The method according to claim 11, wherein the stator coils comprise three phases and the counter-exciting operation is performed in each of the three-phase stator coils.

16. The starting method according to claim 11, wherein a supplement time of the exciting currents to be supplied to the stator coils is gradually increased as step advances, in the stepping process.

17. The starting method according to claim 16, wherein a frequency of the exciting currents varies from a first value larger than a natural oscillation frequency of the motor to a second value smaller than the natural oscillation frequency as step advances, in the stepping process.

18. The starting method according to claim 11, wherein the motor includes:

a sequencer for generating predetermined internal stepping pattern signals;

driver means for supplying the exciting currents to the stator coils in accordance with the internal stepping pattern signals from the sequencer; and control means for controlling the internal stepping pattern signals supplied from the sequencer to the driver means;

and wherein the control means controls the sequencer to supply the driver means with exciting stepping pattern signals skipped every other signal or every two signals in a forward or backward direction from the internal stepping pattern signals, whereby the counter-exciting operation is performed.

19. A multiphase direct current motor, comprising:

a stator provided with stator coils to which exciting currents are supplied;

a rotor provided with a rotor magnet acquiring a rotation torque by electromagnetic interaction with the stator;

bearing means inserted between the stator and the rotor;

revolution detecting means for detecting the number of revolutions of the motor;

control means for controlling the rotation of the rotor by supplying the exciting currents to the stator coils to perform a stepping process and an accelerating process in a starting operation;

a sequencer for generating predetermined internal stepping pattern signals; and driver means for supplying the exciting currents to the stator coils in accordance with the internal stepping pattern signals from the sequencer, during the stepping process the control means controlling the sequencer to supply to the driver means the exciting stepping pattern signals skipped every other signal or every two signals in a forward or backward direction from the internal stepping pattern signals, and the driver means supplying the exciting currents to each phase of the stator coils so as to perform a counter-exciting operation in which the exciting currents are reversed without including a substantial rest time.

20. The motor according to claim 19, wherein the control means controls the sequencer such that the counter-exciting operation is sequentially performed in each phase of the stator coils, in the stepping process.

21. The motor according to claim 19, wherein the control means controls the sequencer such that a supplement time of the exciting currents to be supplied to the stator coils is gradually increased in the counter-exciting operation.

22. The motor according to claim 19, wherein the control means controls, in the accelerating step, the driver means in accordance with a counterelectromotive force induced by the stator coils, and activates the stator coils by the bipolar driving.

23. The motor according to claim 19, wherein the bearing means comprises a dynamic-pressure fluid bearing using oil as a medium.

24. A starting method for a multi-phase direct current motor having a stator provided with stator coils to which exciting currents are supplied, and a rotor provided with a rotor magnet acquiring a rotation torque by electromagnetic interaction, the starting method including stepping and accelerating steps both performed in a starting operation, the stepping step including a step of performing a counter-exciting operation in which the exciting currents are reversed without including a substantial rest time, the counter-exciting operation is sequentially performed in each phase of the stator coils, a supplement time of the exciting currents is supplied to the stator coils and is gradually increased as the step advances, and a frequency of the exciting currents varies from a first value larger than a natural oscillation frequency of the motor to a second value smaller than the natural oscillation frequency as the step advances.

25. The method according to claim 24, wherein the stator coils comprise three phases and the counter-exciting operation is performed in each of the three-phase stator coils.

26. A starting method for a multi-phase direct current motor having a stator provided with stator coils to which exciting currents are supplied, and a rotor provided with a rotor magnet acquiring a rotation torque by electromagnetic interaction, the starting method including stepping and accelerating steps both performed in a starting operation, the stepping step including a step of performing a counter-exciting operation in which the exciting currents are reversed without including a substantial rest time, the counter-exciting operation being sequentially performed in each phase of the stator coils, wherein the motor includes:

a sequencer for generating predetermined internal stepping pattern signals;

driver means for supplying the exciting currents to the stator coils in accordance with the internal stepping pattern signals from the sequencer; and control means for controlling the internal stepping pattern signals supplied from the sequencer to the driver means;

and wherein the control means controls the sequencer to supply the driver means with exciting stepping pattern signals skipped every other signal or every two signals in a forward or backward direction from the internal stepping pattern signals, whereby the counter-exciting operation is performed.

27. A starting method for a multi-phase direct current motor having a stator provided with stator coils to which exciting currents are supplied, and a rotor provided with a rotor magnet acquiring a rotation torque by electromagnetic interaction, the starting method including stepping and accelerating steps both performed in a starting operation, the stepping step including a step of performing a counter-exciting operation in which the exciting currents are reversed without including a substantial rest time, the counter-exciting operation being sequentially performed in each phase of the stator coils, wherein the stator coils are activated by the counter-exciting operation during the accelerating step, and further comprising:

a sequencer for generating predetermined internal drive pattern signals;

driver means for supplying the exciting currents to the stator coils in accordance with the internal drive pattern signals; and control means for controlling the internal drive pattern signals supplied from the sequencer to the driver means;

and wherein the control means controls the sequencer to supply the driver means with exciting drive pattern signals skipped every other signal or every two signals in a forward or backward direction from the internal driver pattern signals, whereby the counter-exciting operation is performed in the accelerating process.

28. The starting method according to claim 27, wherein the stator coils are activated by bipolar driving during the accelerating process.

* * * * *